United States Patent [19]

Scott

[11] E Patent Number: Re. 32,645

[45] Reissued Date of Patent: Apr. 12, 1988

[54] DYNAMIC ROCK STABILIZING FIXTURE

[75] Inventor: James J. Scott, Rolla, Mo.

[73] Assignee: Scott Investment Partners, Rolla, Mo.

[21] Appl. No.: 789,790

[22] Filed: Oct. 21, 1985

Related U.S. Patent Documents

Reissue of:

[64] Patent No.: 4,501,515
Issued: Feb. 26, 1985
Appl. No.: 392,234
Filed: Jun. 25, 1982

[51] Int. Cl.[4] ..... E21D 21/00
[52] U.S. Cl. ..... 405/259; 405/261
[58] Field of Search ..... 405/259–262; 411/15, 57, 60, 82, 411, 414, 61

[56] References Cited

U.S. PATENT DOCUMENTS

| | | | |
|---|---|---|---|
| 1,934,560 | 11/1933 | Rawlings | 411/15 |
| 2,052,793 | 9/1936 | Peirce | 411/57 |
| 2,110,053 | 3/1938 | Phillips | 411/44 |
| 2,203,178 | 6/1940 | Peirce | 411/38 |
| 2,393,606 | 1/1946 | Brush | 411/57 |
| 2,793,884 | 5/1957 | Jungblut | 411/411 X |
| 3,108,443 | 10/1963 | Schuermann et al. | 405/261 |
| 3,304,829 | 2/1967 | Raynovich, Jr. | 411/34 |
| 3,417,653 | 12/1968 | Staats et al. | 411/69 |
| 3,504,498 | 4/1970 | Triplett | 411/34 |
| 3,651,651 | 3/1972 | Triplett | 411/34 |
| 4,022,101 | 5/1977 | Helgesson | 411/60 |
| 4,096,944 | 6/1978 | Simpson | 206/219 |
| 4,216,180 | 8/1980 | Seemann et al. | 405/261 X |
| 4,274,324 | 6/1981 | Giannuzzi | 411/38 |
| 4,303,354 | 12/1981 | McDowell | 405/261 |
| 4,309,137 | 1/1982 | Tanaka et al. | 411/45 |
| 4,313,697 | 2/1982 | Rozanc | 405/261 |
| 4,393,638 | 7/1983 | Sell et al. | 405/261 X |
| 4,400,113 | 8/1983 | Chaiko et al. | 405/261 |

FOREIGN PATENT DOCUMENTS

| | | | |
|---|---|---|---|
| 1525224 | 4/1968 | France | 411/61 |
| 2161175 | 7/1973 | France | 411/61 |

*Primary Examiner*—David H. Corbin
*Attorney, Agent, or Firm*—Gravely, Lieder & Woodruff

[57] ABSTRACT

[Anchor fixture for dynamically stabilizing rock structure comprising a rock support mounted in a bore hole and cooperating with formable means placed in the bore hole to generate tension in the support and to exert compression in the rock structure for dynamically supporting the rock structure upon insertion of the rock support and rapidly developing radial loading forces in the rock and beyond the near boundary of the bore hole.] *Dynamic rock stabilization apparatus in the form of an anchor fixture for use with a roof plate in which the fixture has an anchor rod formed with a surface configuration extending from a lead-in end to the opposite headed end for at least a part of the length of the rod, and a hollow body providing a wall of formable and compressible material having a length less than the depth of a bore hole in the rock structure into which it is to be placed between the rod and the surface of the bore hole, the body engaging the surface configuration of the rod to effect a locking engagement with the rod such that when assembled in a bore hole the body wall has a thickness sufficient to be compressed between the rod surface configuration which has a diameter less than the bore hole and the bore hole surface, and to apply dynamic forces through the rock as a result of the compressibility of the body. The invention includes a method of effecting dynamic rock stabilization by placing a body of formable material in a bore hole and inserting an anchor rod into the body so it engages the body and initiates a cooperative reaction between the bore hole and the rod to stabilize the rock structure.*

17 Claims, 2 Drawing Sheets

DYNAMIC ROCK STABILIZING FIXTURE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to dynamic rock stabilizing fixtures for mine roof support applications.

2. Description of the Prior Art

The state of the prior art is well presented by James J. Scott in a paper A New Innovation In Rock Support-Friction Rock Stabilizers of Apr. 23, 1979 before the Canadian Institute of Mining and Metallury in Canada, and in the paper presented by James J. Scott in May, 1980 at the 21st U.S. Symposium on Rock Mechanics, the paper being entitled Interior Rock Reinforcement Fixtures. The prior art includes also the method of anchoring bolts in drill holes by Schuermann et al U.S. Pat. No. 3,108,443 of Oct. 29, 1963, the grouting of anchors in Simpson U.S. Pat. No. 4,096,944 of June 27, 1978 and the mine roof support of Rozanc U.S. Pat. No. 4,313,697 of Feb. 2, 1982. These examples are directed to the use of resins as anchoring means for rock reinforcement, and to means for mixing the resin anchoring means.

SUMMARY OF THE INVENTION

The present invention provides an improvement in dynamic rock stabilizing fixtures employed to effect support of the roof. The improvement may be embodied in placing in a bore hole in a roof rock structure a formable material of tubular or semi-tubular form having the characteristics of being both flowable and compressible under load, inserting the roof support anchor so it engages the formable material and initiates a cooperative reaction between the bore hole and the anchor, and generates tension in the anchor to react against the rock or geologic mass in the roof to the extent desired.

It is also a feature of the present invention to provide the anchor in the form of a rod or a threaded bolt or a rebar which reacts with the formable material to create a supporting thrust by the means of the formable material being wedged between the surface of the bore hole and the anchor, and in which the continuity of the friction in the system has the effect of developing thrust vectors radiating into the rock formation.

Still another feature of the present invention is to provide a roof support system in which the control over the anchorage capacity is by forming a rod with or without a thread or roughened surface on the anchor and adjusting the length of the anchor surface which is in working relation with the bore hole in cooperation through a formable material or equivalent force distribution mechanism which can be a body of material of flowable character, or a body in tubular, or split tubular or strip form, any of which is capable of establishing a large contact area between the surface of a bore hole and the surface of the anchor rod.

While the present embodiments may have several different forms, as will be discussed presently, an important improvement is in the attainment of shear strength in the anchor right from the start of the installation. That is, the anchor generates dynamic rock stabilizing results immediately which is quite advantageous over other means which employs resins or materials which must go through a setting or cure period. The improvement in performance is that rock stablity and support can be quickly developed and radial loading forces can be generated in the rock or geologic mass beyond the near boundary of the bore hole.

A more complete understanding of the present invention will be found in the following description and illustrations pursuant thereto.

BRIEF DESCRIPTION OF THE DRAWINGS

Presently preferred embodiments of the invention are shown in the following drawings, wherein.

DETAILED DESCRIPTION OF THE EMBODIMENTS

Figure 1:
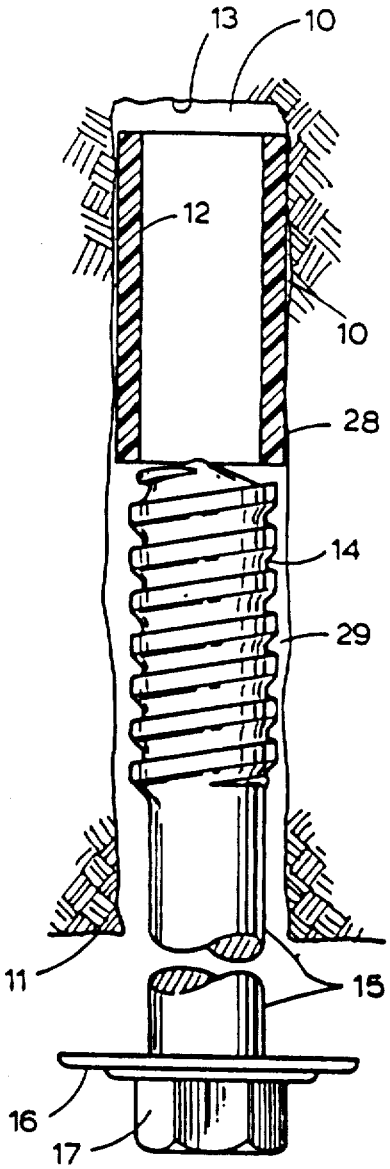
FIG. 1 is a fragmentary sectional elevational view of an embodiment in which an anchor rod of threaded character is about to be threaded into a formable material of tubular characteristic inserted in a bore hole.

In the view of FIG. 1 a bore hole 10 has been formed in a rock formation above the roof 11 of a mine passage. A roof support structure in the form of a dynamic rock stabilizing fixture is installed in the bore hole 10 in the following manner: First, means 12 or an equivalent formable material is located in the bore hole 10 and may extend over a desirable portion of the bore hole length from the closed end 13 of the bore hole. The formable material may consist of a length of compressible and yieldable material. A tube or rolled sheet or crushed resin material selected from the group consisting of polyethylene, polyurethane or polyvinyl chloride (PVC) or similar material, can be semi-hard but sufficiently compressible to conform to the contour or surface 10a of the bore hole 10 as well as yield to the pressure of the threads 14 on the anchor rod 15. The formable material may be a foam material which is blown into the bore hole to fill a portion thereof prior to anchor rod insertion.

Following the placement of the first means 12 in the bore hole 10, an anchor rod 15 is installed by a combination of being vibrated, thrust or torqued into the material in the bore hole, or it may be installed by any of these efforts, to compress and force the material into acting or reacting with the rock formation to substantially immediately set up a dynamic stabilizing restraint therein. The term dynamic is an adjective to characterize motion or change in relation to force or variation in intensity of an applied force. In relation to the subject matter herein, the term describes the ability of the present fixture to apply force on the geologic structure to replace the forces which have been disturbed by removal of some geologic mass. The elongated spiral wedge (FIG. 2) which corresponds to the threads is forced to exert an outward (see the arrows) thrust against the bore hole wall 10a. The tension in the bolt creates forces in the roof from a support plate 16 or geologic support (see arrows) which generates a dynamic support pattern which surrounds the bore hole mouth. The threads 14 on the anchor bolt 15 may be cast, forged, machined or roll-formed so as to have a profile seen in any one of the views of FIGS. 8, 9, 10, 11 or 12, as will be explained presently.

The anchor bolt 15 carries with it the thrust plate 16 which is captured by the rod head 17 which is shaped to accept the drive end of an installation machine. The installation machine may be any of the commonly used types which exert a straight thrust or a combined thrust and torque, or any of the foregoing with a vibratory action, or just a vibratory action. The anchor rod 15 is driven into the bore hole 10 until the plate 16 contacts the roof 11. Typical vector diagrams in the Scott paper (supra) of 1980 show the direction of thrust of the anchorage and the reaction of the support plate 16. Such vector diagram has been illustrated in FIG. 2.

The fixture which is employed in the foregoing system comprises a tubular component selected from materials which may be a normal tube but which may be fractured or split when subjected to severe compression loading. The material of the tube must be capable of flowing when compressed so as to lock the rod in place in the bore hole, or to conform to the surface of a bore hole in the rock formation, as well as conform to the anchor rod when treated with threads or roughness. The anchor which may be normally formed of a low carbon steel having a 40 to 80 thousand psi yield and capable of responding to the formation of threads by roll forming methods, has threads formed as buttress type ([FIG. 7]*FIG. 10*) having a buttress angle A which may vary from 30° to as much as 80° perpendicular to the anchor rod axis. The thread pitch is such that the rate of advance of the anchor rod into the bore hole is compatible with the feed rate of the installing apparatus so the rod does not advance so fast the apparatus cannot maintain engagement. A buttress thread having about 4 threads per inch and a single start has been found to be satisfactory. Multiple start threads may also be employed.

Considering, for example, the rock stabilizer fixture seen in FIG. 1, and for a bore hole of substantially one-inch in diameter, the anchor rod thread length may be as short as four to six diameters of the bore hole, and it may be threaded through its entire length to provide a full contact anchor when the conditions warrant that treatment. The thread crest can be as much as fifteen-sixteenth inch thus providing an average dimension for the annular space of about one-thirty second of an inch. The thread root or minor thread diameter mayber about three-fourths inch. The formable means cooperating with the foregoing anchor rod of threaded character, when in the form of a tube, may have a wall thickness of from about one-sixteenth inch to as much as one-hundred percent greater than the radial dimension of the annular space. When the formable means is in the form shown in FIG. 4, its thickness is in the range of two-hundred percent of the radial dimension of the annular space.

Figure 2:
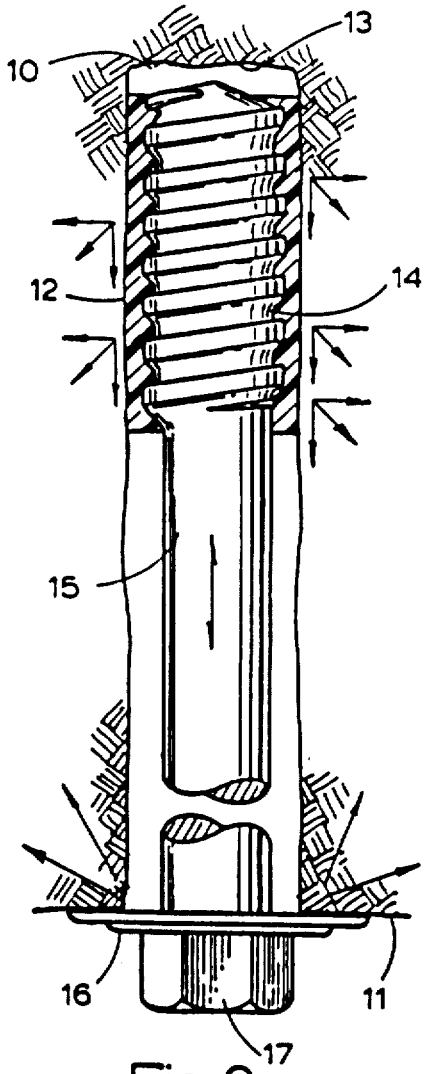
FIG. 2 is a similar fragmentary sectional elevational view of the embodiment of FIG. 1 after the anchor has been threaded home in the bore hole to illustrate the resulting conformation of the formable material with the anchor bolt threads.

The fixture of FIGS. 1 and 2 illustrates the immediate dynamic restraint which takes place as the anchor 15 is installed into the formable means 12 in the bore hole 10. The compression of the means 12 exerts radially directed loads in the rock formation as depicted by the arrows. As the anchor attains its fully inserted position with the plate 16 abutted on the roof 11, the axially directed loading in the anchor develops multiple resultant force vectors 30 acting in many directions in the rock formation. The threads 14 on the anchor rod 15 compress the formable means 12 into a substantially continuous spiral wedge W (see FIG. 3) which distributes the loading in the rock formation along the length of the bore hole surface 10a. If the bore hole develops some recesses or enlargements during its drilling, the formable material will be forced by the anchor rod to expand at such zones so the spiral character of the wedge may be reduced or interrupted. The length of the anchor rod which acts on the rock formation allows for control over the stabilizing effect deeming necessary and the capacity of the anchorage.

Figure 3:
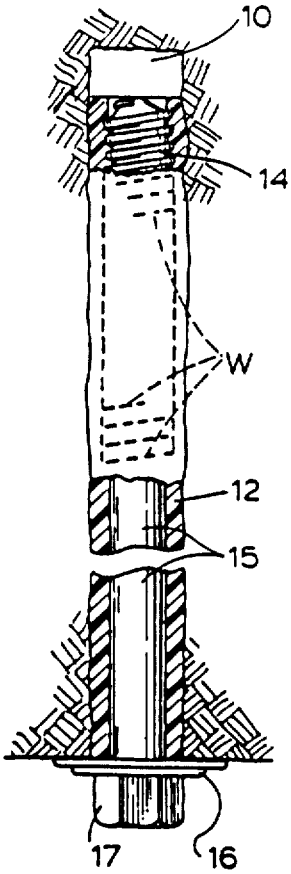
FIG. 3 is a fragmentary sectional view showing a modification in which a formable material of tubular character is substantially equal to the bore hole depth to provide a protective sleeve for the unthreaded portion of the bolt.

As seen in FIG. 3, the formable means 12 is extended for the entire length of the bore hole 10 while the anchor rod 15 has been formed with threads 14 for less than the full length thereof. The means 12, in this instance, is performing a function of protectively encasing the rod 15 against deterioration from effects that may arise from the surrounding rock formation.

Figure 4:
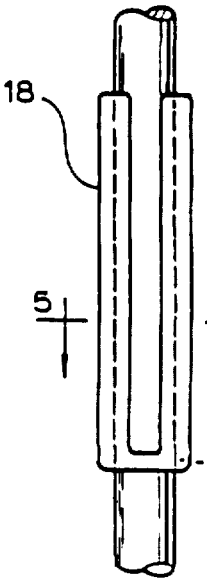
FIG. 4 is a fragmentary elevational view of a modified formable material in the character of strips of a tube held at an end by an uncut collar.
Figure 5:
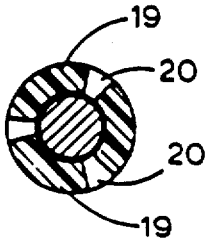
FIG. 5 is a sectional view at line 5—5 in FIG. 4.

A modified treatment of formable material is seen in FIGS. 4 and 5 where the means 18 may comprise strips 19 of the foregoing compressible material held together by an end collar or ring 20. Each strip will, of course, be substantially equal in length, but the circumferential extent of the strip 19 can be varied.

Figure 6:
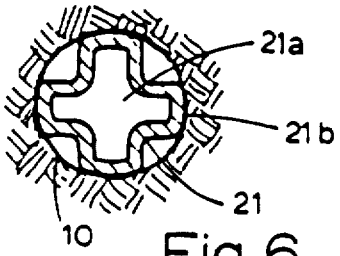
FIG. 6 is a further modification of a formable material in a clover-leaf type configuration.

Still another treatment of the formable material 21 is seen in FIG. 6 where the circumferential extent of the material is greater than the circumference of the bore hole 10. In that event, the material will buckle or it may be initially formed into a quasi-clover leaf in cross-section so that certain lobes 21a extend radially into the central area and intervening lobes 21b are in contact with the bore hole 10. When the threaded anchor bolt is inserted it will force the material of lobes 21a into conformation to create spiral wedges, much like the character of spiral wedges to be formed in the case of the means 12 of FIG. 2.

Figure 7:
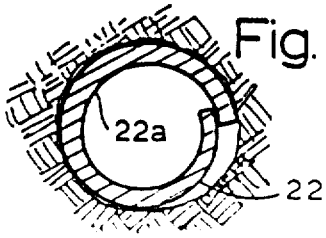
FIG. 7 is a further modification of formable material which is rolled on itself and positioned in the bore hole so the free margins expand but remain in overlapped relation.

Still another treatment of the formable material is seen in FIG. 7 where, with sheet material 22, the circumferential extent of the material is greater than the circumference of the bore hole 10. In that event, the material will overlap at 22a into the central area while still in contact with the bore hole. When the threaded anchor rod is inserted it will force the material 22 into conformation of interrupted spiral wedges, much like the character of spiral wedges to be formed in the case of the means 18 of FIG. 4.

Figure 8:
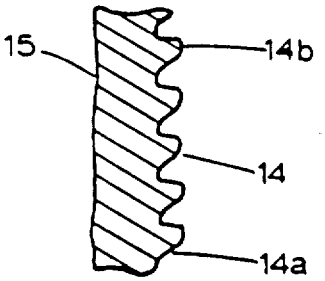
FIG. 8 is a fragmentary sectional view of a buttress thread profile having utility in this invention.

Turning now to FIG. 8, the anchor 15 is seen in section to have a buttress thread 14 in which the buttress surface 14a may have an angular relation A to the perpendicular to the axis of elongation of the anchor which may vary from about 30° to about 80°. This form of buttress thread has generously rounded thread crests 14b.

Figure 9:
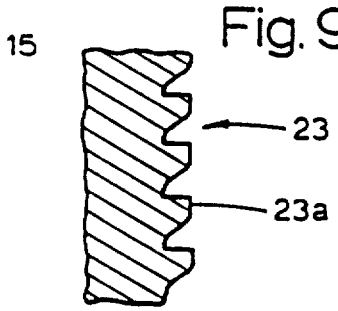
FIG. 9 is still another fragmentary sectional view of a modified buttress thread profile useful herein.

A modifed buttress thread 23a is seen in FIG. 9 where the anchor 15a has the thread crest formed with a slight flat surface 23a.

Figure 10:
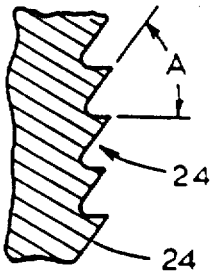
FIG. 10 is a fragmentary sectional view of a modified buttress thread having a sharp crest.
Figure 11:
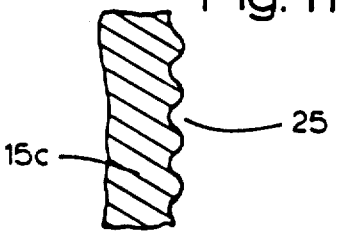
FIG. 11 is a fragmentary sectional view of an anchor rod having a rope thread profile.

The anchor 15b is seen in section in FIG. 10 to have a still further modified buttress thread 24 in which the buttress surface 24a may have an angular relation A to the perpendicular to the axis of elongation which may vary from about 30° to about 80°. This form of buttress thread has normal sharp thread crests 24b.

An alternate to the buttress type thread is the anchor 15c with rope thread 25 seen in FIG. 10. This thread is more open and is generously rounded.

Figure 12:
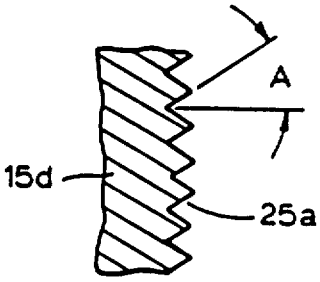
FIG. 12 is a further fragmentary sectional view of a common screw thread which conforms generally to the American National Form.

A further modification of a useful thread is seen in FIG. 12 which is an American National Form of thread 25a on a rod 15d.

Figure 13:
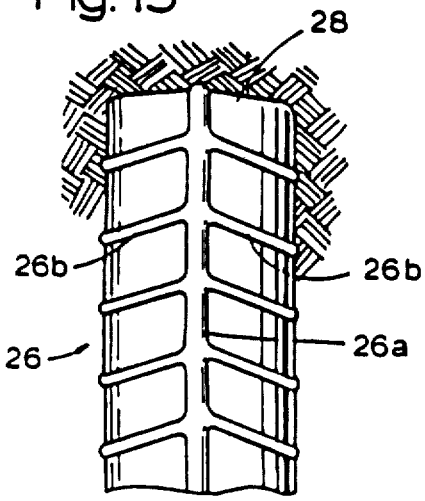
FIG. 13 is a fragmentary elevational view of an anchor rod having a roughened surface treatment.

As before mentioned, the anchor may vary in surface treatment from any of the threaded forms to a rough surface 26 as in FIG. 13 where one form of surface treatment may be such as is found in reinforcing bars and rods. In FIG. 13, the surface is press-formed with one or more longitudinal ribs 26a and lateral ribs 26b.

Figure 14:
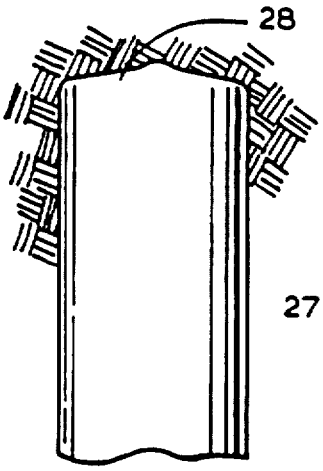
FIG. 14 is a fragmentary elevational view of an anchor rod having a smooth surface.

The simplest form of anchor is a plain, smooth surface rod 27 as seen in FIG. 14. The rod 27 is formed with a lead-in end 28 for ease of entry, and the previously described rods may be similarly formed.

Returning to FIGS. 1 and 2, it can be observed that the annular space 29 between the anchor rod 15 and the surface 10a of the bore hole 10 is substantially less than the wall thickness of the formable means 12. As the anchor 15 is installed into the tube 12 the tube wall is compressed so it conforms with the bore hole surface 10a and fills the threads 14, with the result that the rock or geologic mass is loaded, as depicted in FIG. 2. There is also a circumferential loading of the formable material surrounding the rod 15. The tension in the rod produces angularly downwardly resultant pressure vectors 30. All of these forces are dynamic as they become immediately active as the rod 15 is moved into final position and provides an immediate restraint to rock formation near the bore hole. The vector forces near the crest of the thread are larger than the force vector near the root of the thread, and this results in a variable spiral loading through the formable material on the rock.

In the use of the threaded anchor 15, there is a definite spiral wedge W formed (See FIG. 3) in the annular space 29. Tests have confirmed the presence of the spiral shaping in the outer surface of the tubular means 12 and also the spiral shaping in the inner surface. The same impressions are formed in the formable material when it takes the modified forms seen in FIGS. 4, 5, 6 or 7 as well as when the anchor of FIG. 13 is employed.

When a smooth anchor rod 27 of FIG. 14 is employed, it is installed with the annular space between it and the bore hole overfilled with formable material so that a high friction loading is developed between the smooth surface and the formable material due to the radial and circumferential forces acting thereon as depicted according to FIG. 2.

The foregoing specificatioon has set forth characteristics of the present improvement which call for providing formable material in such volume greater than the [redline] *volume* of the annular space around the anchor rod so that active anchorage is obtained and the rod is locked up in its position. The friction grip between the rod and the bore hole is improved whether the rod is threaded or roughened or smooth. It has been determined that a tubular formable material will substantially stay in its initial position during insertion of the anchor bolt. The performance of the present fixture is found to provide superior rock stabilization and has economic advantages not realized by older fixtures.

Figure 15:
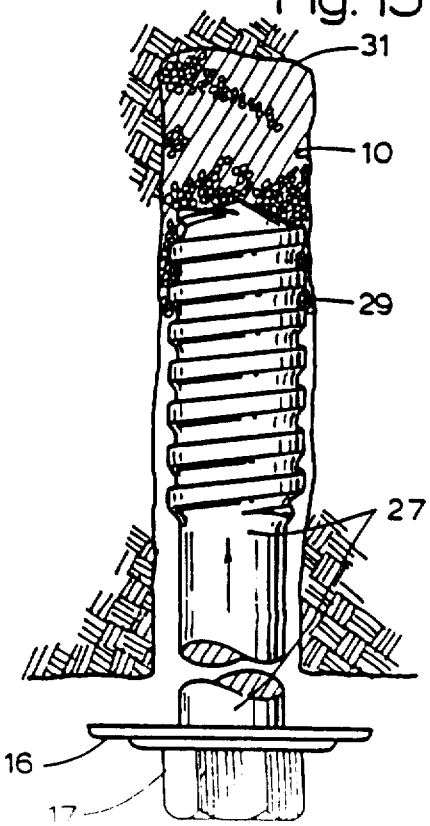
FIG. 15 is a fragmentary elevational view, partly in section of a further modification of a bore hole filled with a formable anchor material for an anchor rod.

Referring to FIG. 15, the bore hole 10 in the rock formation is filled up to a desired volume with a flowable material by suitable means initially in a cartridge. The Material may be selected from such cellular composition which will act very much like tubular means in that it will be compressed by the rod as it is inserted and generate the immediate rock restraint that has been discussed previously. In FIG. 15 the bore hole 10 received the flowable material 31 which is forced by the insertion of the rod 15 to propogate along the rod in the annular space 29 and substantially immediately establish rock stabilization. The material 31 may be any of the before mentioned resins, with a retardent agent, which is placed in the bore hole 10 by a blowing agent such as freon or similar agent, or air. The resin reacts in the air to expand and form a body which frictionally supports itself in the bore hole. The anchor rod 15, in any of its thread forms is inserted and causes the body of material to propogate along the annular space 29 and form the wedge locking the anchor in the bore hole. In addition, the material may be a shredded and deformable material with a binder which is used merely to hold the material in place until a threaded [cycle] type rod is installed, primarily by application of torque. The friction generated between the rod and the body of material 31 is sufficient to arrest tendency of the material to want to cause the rod to rebound and back out of the bore hole.

It can now be appreciated from the foregoing details of the preferred embodiments that the friction anchor may be in the form of either a threaded bolt, a rough surface rebar or a smooth rod. In assembling the fixture it can be appreciated that whichever form the anchor element of a fixture assumes, the formable material arranges itself or is forced to become wedged between the surface of the anchor and the surface of the surrounding bore hole. In order to obtain the wedging action the annular space surrounding the anchor itself must have a radial dimension which is smaller than the thickness of the formable material which is provided to lock the anchor in the bore hole. In certain cases as shown in FIG. 1, the formable material has a greater volume than the volume of the annular space between the anchor and the bore hole. When the formable material assumes the configuration as shown in FIG. 4, the volume thereof is not as important as is the thickness of the strips. In the form of the formable material of FIG. 6 the substantial increase in the circumferential surface of the formable material relative to the circumferential dimension of the bore hole may develop a volumetric differential between the annular space surrounding the anchor and the body of the formable material.

In its broadest aspect, the rock support fixture comprises a formable body of compressible material (FIGS. 1, 4, 6, 10 and 15) which is located in the bore hole and has a shape, or is capable of being arranged, to enable it to engage the surface of the bore hole and to receive the anchor rod and lock it in position, and an anchor rod having a diameter less than the bore hole diameter such that an annular space is formed therebetween to receive the formable body. The placement of the rod within the formable body develops substantially immediately shear strength under compression of the material, and a dynamic radial loading on the rock or geologic mass, and the coming together of the formable body and the anchor rod establishes an active rock or geologic mass reinforcement without any delay or waiting time. The fixture is completed with a support plate retained by the rod in supporting engagement with the geologic mass at the bore hole entrance.

It can be appreciated that the formable body can assume several different configurations as above specified or equivalents thereof and the anchor may also assume several different configurations with respect to presenting a plain surface to the formable material or having surface treatment which may vary in respect of thread formations or rebar surface treatment. The present fixture is intended to and does develop immediate restraint of the rock at the time of insertion of the anchor. The anchor rods, in whatever form, are moved into position in a dynamic manner by being subject to a combination of thrust and torque or are inserted with a combination of thrust and repetitive impact such as is generated by an air hammer. In the placement of a threaded rod, torque is primary and thrust is secondary, but when placing a rebar thrust or impact is primary and some torque is helpful or may be required. In a rock stabilizer of the present invention the formable body develops friction contact with the surface of the bore hole, whether smooth or irregular, and the rod maintains the formable body in a state of dynamic support of the geologic mass so that any shift of the rock relative to the anchor rod does not result in loss of contact or anchorage along the length of the formable body.

It should now be understood that the preferred embodiments of the present invention may have variations or modifications without departing from the scope of the invention herein disclosed.

What is claimed is:

1. An anchor fixture for stabilizing geologic structure exposed in forming a mine passage in a geologic structure for recovery of material in such geologic structure, the exposed geologic structure having a bore hole of predetermined diameter to receive the anchor fixture, said anchor fixture comprising:

(a) an elongated body of formable plastic material in the shape of a tube having opposite edges that overlap to present a continuous circumferential wall to the circumferential surface in the bore hole opening, the tube wall having a thickness of the order of substantially 0.0625 to 0.125 inches;

(b) an elongated rod received in said body of formable plastic material, said rod having a raised surface along its length in the form of a buttress thread having a flattened crest and with the buttress face directed toward the mine passage to place said formable plastic material in full circumferential contact with the bore hole under load to exert a continuing supporting thrust by the formable plastic material between the bore hole circumferential surface and the buttress thread for establishing a dynamic system of vector forces radiating into the geologic structure;

(c) said elongated rod having a diameter as measured from the flattened crest of the buttress thread less than the diameter of the bore hole, and said body of formable plastic material having a wall thickness greater than the annular space between the bore hole surface and the flattened crest of said buttress thread, and said body of formable material being forced by insertion friction of said rod to flow into the buttress thread to assume the shape of the buttress thread on the inner surface of the formable plastic material and to react following rod insertion in compression between the flattened crest and root of the buttress thread and the surface of the bore hole for creating loading forces radiating into the geologic structure beyond the boundary immediately adjacent the bore hole;

(d) a rigid structure support plate engaged on said rod and held thereby directly against the exposed geologic structure surrounding the bore hole, the engagement of the structural support plate against the exposed geologic structure reacting on said rod to exert axial tension in said rod and compression of the formable plastic material through the buttress face of the buttress thread such that a substantially continuous dynamic spiral wedge is created along the bore hole surface for supporting the geologic structure with a dynamic support pattern surrounding the bore hole adjacent the exposed structure and locking said rod in the bore hole with said rigid structural support plate in position to oppose the tendency of the geologic structure to move.

2. An anchor fixture for stabilizing geologic structure exposed in forming a mine passage, the exposed structure having a bore hole of predetermined diameter to receive the anchor fixture, said anchor fixture comprising:

(a) a body of formable plastic material in the shape of an elongated tube with opposite elongated edges in overlapping positions to present a continuous surface with a circumferential dimension that fits the circumference of the bore hole, said tube having a wall thickness of the order of substantially 0.0625 to 0.125 inches;

(b) an elongated rod having a preformed surface configuration thrusted into said tubular shaped body, said surface presented to said tubular shaped body generating friction heat for causing said plastic material to flow and generally conform to said surface configuration on its inside and outside surfaces for creating a dynamic system of vector forces around the circumference of the bore hole; and (c) a rigid support plate engaged on said rod and retained in contact by said rod against the surface of the exposed mine passage, said support plate placing said rod in axial tension so that the dynamic system of vector forces around the circumference of the bore hole are maintained by said plastic material and substantially match the surface configuration of said rod.

3. The anchor fixture set forth in claim 2 wherein said tubular shaped body has a wall thickness such that its volume is greater than the volume of the annular space between said rod and the bore hole surface.

4. The anchor fixture set forth in claim 2 wherein said plastic material has a thickness of the order of from about 0.0625 to about 0.125 inches and up to a thickness of as much as one-hundred percent greater than the radial dimension of the annular space between the rod and the surface of the bore hole.

5. The anchor fixture set forth in claim 2 wherein said preformed surface of said rod is a buttress thread having a flattened crest and positioned with the buttress face directed toward the mine passage, said buttress thread having a diameter at said thread crest of about fifteen-sixteenth inch and a diameter at the thread root of about three-fourth inch such that the annular space around said rod relative to the bore hole diameter is about one-thirty second of an inch, and said vector forces are variable being greater in the area of said flattened crest than in the area of said thread root.

6. *An anchor fixture for use with a roof plate for stabilizing geologic structure which has a bore hole of a predetermined diameter and length from a closed end formed therein to an open end, said anchor fixture apparatus comprising:*

*(a) an elongated rod that is at least substantially the length of said bore hole from a lead-in end of the rod to an opposite driven end, said rod having a diameter that is less than the predetermined diameter of said bore hole,*

*1. said elongated rod having an uneven surface formed thereon extending from said lead-in end thereof toward the opposite driven end over at least a portion of its length which is less than the length of said rod and less than the length of the bore hole; and*

*(b) a body of compressible plastic material, having a length, from adjacent the closed end of the bore hole, less than the length of the bore hole and adapted to be formed into a tubular shape having an initial diameter and flexibility to permit the tubular shape to expand and conform to the bore hole surface and the uneven surface of said rod upon interpositioning of said body between said uneven surface of said rod and said bore hole spaced from the open end thereof whereby said compressible plastic material responds dynamically to the presence of said rod in the bore hole,*

*1. to effect a locking engagement of said uneven surface of said lead-in end of said rod with said body, thereby to fasten said rod in said bore hole from said lead-in end, and*

*2. to transmit thrust forces from the uneven surface of the rod into the geologic structure of the bore hole through said body.*

7. *An anchor fixture apparatus for use with a roof plate for stabilizing a geologic structure which has a bore hole of a predetermined diameter along its depth from a closed end to an open end, said anchor fixture apparatus comprising:*

*(a) an elongated rod at least as long as the bore hole depth between the open and closed ends and having a lead-in end, an opposite driven end, and a surface configuration on said rod extending from said lead-in end along a predetermined portion of the length of said rod as measured from the lead-end which is less than the length of said rod and has a diameter that is of the order of approximately one-sixteenth inch smaller than the predetermined bore hole diameter such that said rod surface configuration has a loose fit relative to the bore hole; and*

*(b) an elongated body of a formable and compressible material positionable adjacent the closed end of the bore hole and having a length less than the bore hole depth, and said body having an initial tubular shape for reception in the bore hole and being yieldable to split under compression and expand radially outwardly in the bore hole for receiving said elongated rod, said body of formable and compressible material being compressed by said rod surface configuration, and said formable and compressible material responding dynamically to the presence of said rod in the bore hole,*

*1. to effect a compression locking engagement along the length of said surface configuration on said rod within said body thereby to secure said surface configuration on said rod in the bore hole, and*

*2. to apply thrust forces through said body along the length of the engagement of said rod and body into the geologic structure.*

8. *An anchor fixture for dynamically stabilizing geologic structure having a bore hole drilled to a predetermined diameter and depth to receive the anchor fixture and extending to a closed end in the geologic structure from an anchor fixture receiving open end, said anchor fixture comprising:*

*(a) an elongated rod having a length from a lead-in end to an opposite driven end adjacent the open end of the bore hole and a surface configuration extending along a portion of the rod less than the length of said rod from the lead-in end thereof, the diameter of which surface configuration portion is less than the bore hole diameter, such that an annular space is created whereby the surface configuration portion of said rod has a loose fit in the bore hole,*

*(b) an elongated body of compressible and formable material adapted to be passed into the bore hole so as to be positioned adjacent the closed end of the bore hole and have a length less than the depth of the bore hole and extending along the bore hole from adjacent the closed end thereof, said body being responsive under compression by said rod to split and gap while occupying a position adjacent said rod from said lead-in end and so as to present a wall between said surface configuration on said rod and the adjacent bore hole, said body wall having a thickness to exceed the dimension of the annular space that allows for the loose fit of said rod in the bore hole, whereby said rod forces said body to radially expand against the bore hole surface for effecting a locking engagement of said rod surface configuration within said body and for transmitting thrust forces through said body into the bore hole and the adjacent geologic structure and*

*(c) a thrust plate held by said rod against the geologic structure surrounding the anchor fixture receiving end of the bore hole, said thrust plate loading said rod in tension whereby said body reacts between said rod and the bore hole surface for dynamically stabilizing the geologic structure surrounding the bore hole.*

9. *The anchor fixture according to claim 8 wherein said elongated body of formable material is initially in the form of a sheet presenting an external circumferential surface engaged with the bore hole, and said elongated rod upon being inserted in said body of formable material acts to compress said body between the surface configuration of said rod and the bore hole surface for developing substan-* tially immediate shear strength under compression of said body of formable material.

10. The anchor fixture according to claim 8 wherein the wall thickness of said elongated body of formable material may be selected to fall into a range of from a minimum of about one-sixteenth inch to a maximum of as much as one-hundred percent greater than the radial dimension of said annular space between said surface configuration on said rod of formable material and the bore hole surface.

11. An anchor fixture for maintaining dynamic support and stabilizing forces in a geologic structure having a bore hole drilled to a predetermined depth and diameter, the anchor fixture being mounted in that bore hole adjacent the closed end thereof, said anchor fixture comprising:

(a) an elongated rod having a lead-in end and a driven end and a thread on at least a portion of the length of its surface that is less than the rod length as measured from adjacent a lead-in end, the thread having a rounded crest with a buttress face directed toward the driven end of said rod upon insertion of the rod into the bore hole, and the thread crests having a diameter that is less than the bore hole diameter thereby leaving an annular space between the bore hole and the thread crests;

(b) an elongated body of compressible and formable material positioned adjacent the closed end of the bore hole and having a length less than the depth of the bore hole for anchoring said threaded portion of said elongated rod in the bore hole adjacent the closed end of said bore hole, said body of formable material having a length less than the depth of the bore hole and having a wall thickness which substantially fills the volume of the annular space between the bore hole and said threads on said rod such that the rod threads are imprinted in said material and in turn the formable material is forced to flow into the threads and is compressed against the surface of the bore hole adjacent the closed end thereof for initiating a condition of dynamic support through the bore hole surface and into the geologic structure through said rod exerting thrust forces into the geologic structure along the length of the engagement of the rod threads in the body of formable material; and (c) a load bearing plate engaged on said rod and retained against the geologic structure by the rod engaged in said formable material, said rod being forced into said bore hole so as to be loaded in tension by said plate being retained against the geologic structure for maintaining the condition of dynamic support of the geologic structure and thrust forces radiating into the geologic structure surrounding the bore hole.

12. The anchor fixture according to claim 11 wherein said body of formable material and said rod generates body of formable material in a state of dynamic support of the geologic structure, and said formable material is yieldable laterally so that the occurrence of shift in the geologic structure laterally relative to said rod continues the dynamic support of the geologic structure and anchorage along the length of said formable body.

13. The anchor fixture according to claim 11 wherein the thrust forces adjacent said thread crest are large compared with thrust forces adjacent the root of the threads to produce a variable spiral loading through the formable material upon the geologic structure.

14. A method of dynamically supporting and stabilizing the geologic structure adjacent a bore hole in such structure, the method comprising the steps of:

(a) forming a closed end bore hole of a predetermined diameter and depth to a closed end in the geologic structure from an open end in an exposed surface thereof;

(b) providing an elongated rod having a lead-in end with a surface configuration along a portion of the rod lead-in end less than the length of the elongated rod, and which has a diameter that is less than the predetermined diameter of the bore hole such that there remains an annular space between the bore hole and the surface configuration portion of the rod;

(c) selecting a body of formable material having a wall with a thickness greater than the difference between the predetermined diameter of the bore hole and the diameter of the surface configuration portion of said rod;

(d) forming that body of formable material into a tubular configuration that has a length less than the depth of the bore hole as measured from the closed end in such geologic structure;

(e) assembling the tubular body of the formable material and the elongated rod in the bore hole such that the tubular body is compressed radially outwardly against the surface of the bore hole by the surface configuration portion on said elongated rod such that the elongated rod is anchored through the length of the formable material compressed by the length of the surface configuration on said rod adjacent the lead-in end thereof to create dynamic support and stability of the geologic structure; and (f) providing a load bearing plate on the elongated rod to contact the exposed surface of the geologic structure thereby exerting tension on the elongated rod and maintaining the tubular body in a state of compression for continuing the dynamic support of the geologic structure.

15. A method according to claim 14 wherein the step of assembling the tubular body and the elongated rod causes the formable material of the tubular body to flow into and substantially fill the surface configuration on the rod.

16. A method according to claim 14 wherein the step of selecting the rod of a given diameter and the thickness of the formable material is such that there is created a condition where the rod is substantially locked in the bore hole.

17. A method according to claim 14 wherein the step of forming the configuration on the elongated rod extends over a length thereof substantially equal to the length of the body of formable material.

• • • • •

UNITED STATES PATENT AND TRADEMARK OFFICE

CERTIFICATE OF CORRECTION

PATENT NO. : Re. 32,645

DATED : April 12, 1988

INVENTOR(S) : James J. Scott

It is certified that error appears in the above-identified patent and that said Letters Patent is hereby corrected as shown below:

Claim 6, column 9, line 1 after "fixture" and before the word "for" the word "apparatus" should be restored (inserted)

Claim 12, column 11, line 2 of claim 12 after the word "generates" bridging lines 2 and 3, delete "body of formable material in".

Claim 14, column 12, line 4 of claim 14, delete "closed end".

Claim 17, column 12, line 2 of claim 17, after "rod" and before "extends" please insert the phrase"is such that is".

Signed and Sealed this

Second Day of May, 1989

*Attest:*

DONALD J. QUIGG

*Attesting Officer*

*Commissioner of Patents and Trademarks*